Jan. 23, 1940.                L. H. MOULTHROP              2,187,806
                         ELECTRIC SOLDERING DEVICE
                           Filed March 16, 1939
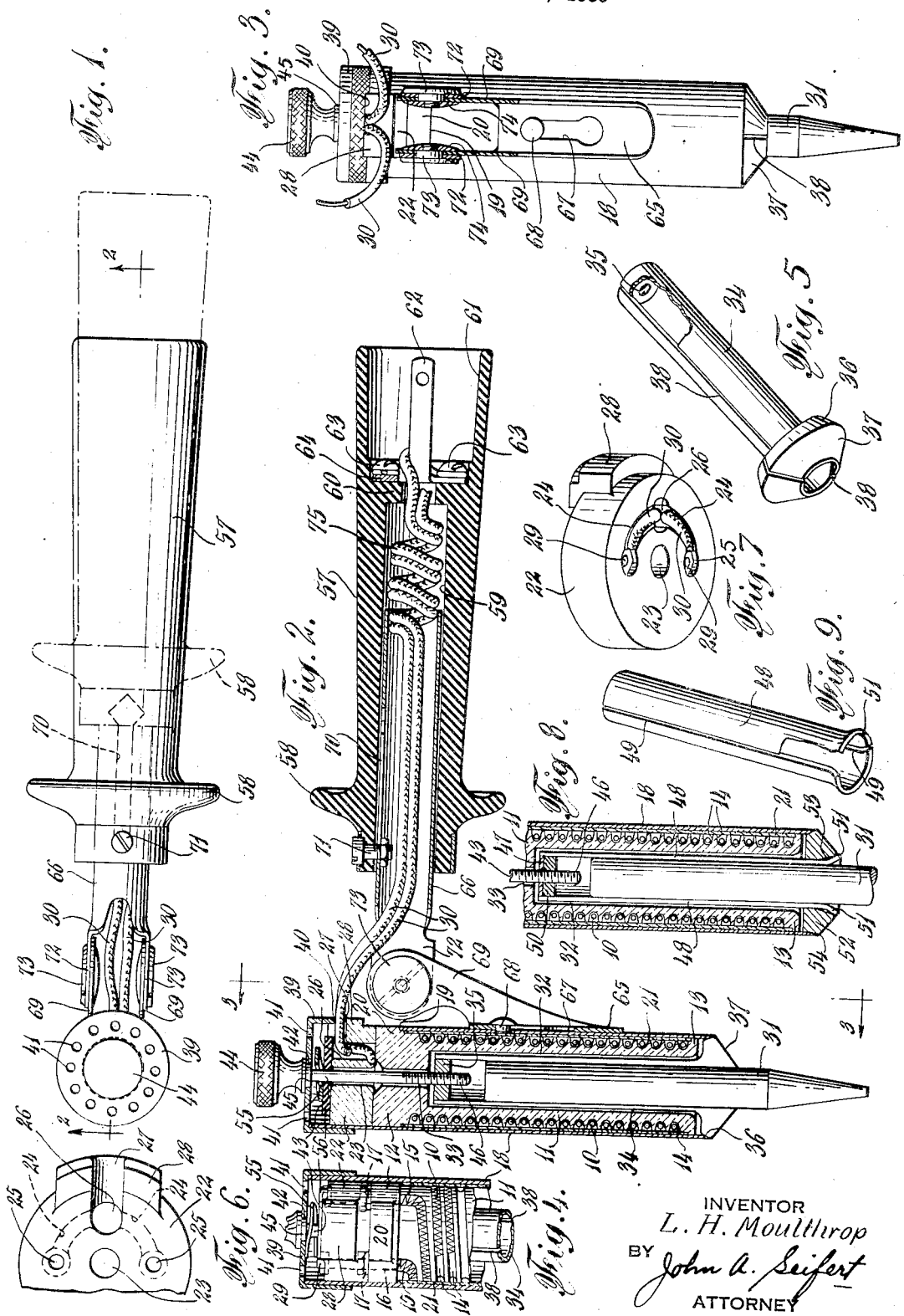
INVENTOR
*L. H. Moulthrop*
BY *John A. Seifert*
ATTORNEY Patented Jan. 23, 1940

2,187,806

UNITED STATES PATENT OFFICE 2,187,806

ELECTRIC SOLDERING DEVICE

Lembert H. Moulthrop, Bridgeport, Conn.

Application March 16, 1939, Serial No. 262,111

19 Claims. (Cl. 219—26)

This invention relates to electrically heated devices and particularly electrically heated soldering devices or irons, and it is an object of the invention to provide improved means for releasably retaining a soldering bit in a soldering device in proximity with a heating element thereof and which means will prevent the binding or fusing of the soldering bit in the device and rendering useless the device.

It is another object of the invention to provide an improved construction and arrangement of parts of a soldering device whereby the parts are releasably retained in assembled condition and a soldering bit is retained in adjusted position in the device by a single element.

It is a further object of the invention to provide an improved construction and arrangement of a tubular electric heating element and means for retaining a soldering bit within the heating element whereby the necessity of electric insulation between the heating element and soldering bit is eliminated.

It is a further object of the invention to provide a carrying shell for the electric heating element co-operating with the means to retain a soldering bit in the heating element to permit the heating element to be readily removed from the shell and be replaced by heating elements of different heat capacities.

It is a further object of the invention to provide means to adjustably support a soldering device whereby the soldering device may be adjusted in position toward or away from the supporting means and the soldering bit may be positioned in different angular positions relative to the supporting means to facilitate soldering points that could only be reached with difficulty otherwise and permit the balancing of the weight of the soldering device.

Other objects and advantages of the invention will appear hereinafter.

In the drawing accompanying and forming a part of this application,

Figure 1 is a view looking at the top of the device forming the embodiment of the invention and showing in dot and dash lines the position of the supporting means extended from the soldering device.

Figure 2 is a cross sectional view of the device taken on the line 2—2 of Figure 1 looking in the direction of the arrows and showing a soldering bit secured therein.

Figure 3 is an elevational view of the soldering device looking at Figure 2 on the line 3—3 of said figure in the direction of the arrows and showing in section a pivotal connection between the soldering device and support therefor.

Figure 4 is a fragmentary view of the upper portion of the soldering device showing the carrying shell in section, and the heating element and an electrical connection member in full lines to show the electrical connection of the heating element to a source of electric energy.

Figure 5 is a perspective view of the means for releasably retaining a soldering bit in the soldering device as shown in Figure 2.

Figure 6 is a view looking at the top of the electric connection member to show a passage for electric conductors from the soldering device to the support therefor.

Figure 7 is a perspective view of said electric connection member shown in Figure 6 looking at the bottom thereof and showing contacts for electrical connection with the heating element.

Figure 8 is a fragmentary view in section of the heating element mounted in the carrying shell and showing a modified form of the means for releasably retaining the soldering bit wherein the shell is arranged with a restricted opening to cooperate with said modified means.

Figure 9 is a perspective view of the releasable retaining means shown in Figure 8 with a portion broken away to show the structure thereof.

In the embodiment of the invention illustrated in the drawing, there is provided a heating element comprising a coiled strand of electric resistance wire 10 coiled around and carried upon the exterior of a tubular mounting member 11 of dielectrim material having a high thermal conductivity. The opposite end portions of the mounting member 11 are of enlarged diameter, as at 12, 13, with the portion 12 of greater length and the intermediate portion of said member is provided with two spiral grooves 14 in the exterior surface commencing at the same point adjacent the enlarged end 13 and terminating at separate points adjacent the opposite enlarged end 12, as at 15 in Figure 4. In mounting the resistance wire 10 upon the member 11, the wire is folded upon itself intermediate its ends and engaged in the grooves 14 with the folded portion of the wire at the commencement of the grooves and the opposite end portions of the wire extended from the terminating portions 15 of the grooves through openings 16 in the enlarged end 12 of the member 11 in alinement with the groove portions 15, and said opposite ends or terminals of the wire 10 being connected to headed pins or screws 17 engaged in said openings with the heads projecting above the end of the member 11 to constitute electric contact members. A straight resistance wire may be substituted for the coiled wire 10 without affecting the heating qualities of the heating element or requiring change in the structure of the tubular member.

The tubular member 11 carrying the electric resistance wire 10 is removably mounted in a tubular enclosing casing or shell 18 having a straight wall and said wall being arranged at one end of the shell with an elongated opening 19 for the engagement of a portion 20 projecting laterally from the enlarged end 12 of the member 11. Said portion 20 is adapted to abut the inner transverse edge of the opening 19 and support the member 11 in the shell 18, as shown in Figures 2 and 3. The length of the shell 18 is greater than the length of the tubular member 11, so that when the projection 20 abuts the transverse edge of the opening 19, the opposite ends 12, 13 of the tubular member 11 will terminate within the shell 18 with the end portion 12 being spaced a greater distance from the adjacent end of the shell than the other end 13 of the tubular member relative to its adjacent end of the shell. The diameter of the opposite enlarged end portions 12, 13 of the member 11 is slightly less than the diameter of the bore of the shell to facilitate the engagement of the member 11 in the shell and said enlarged end portions will position the resistance wire 10 mounted in the groove 14 in spaced relation to the shell. The resistance wire 10 is insulated from the shell by a sheet of heat and electric insulating material, such as mica, wrapped around the resistance wire with the opposite edges of the sheet abutting the enlarged end portions 12, 13, so that the sheet will occupy the space between the shell and groove 14, as shown at 21 in Figures 2, 4 and 8.

The electric wire 10 is connected to a source of electric energy through a connection member comprising a circular block 22 of electric insulating material having a central opening 23 therethrough and one end face arranged with arcuately extending recesses 24 leading from openings 25 extended through the block on diametrically opposite portions of the central opening 23 and to another opening or passage 26 extended through the block intermediate the openings 25 and communicating with a channel 27 in the end face of the block opposite the face arranged with the arcuate recesses 24, said channel 27 extending radially from the opening 26 to the periphery of the block. The block 22 is also arranged with a protuberance 28 extending from the end face having the channel 27 and the peripheral portion to which the channel 27 extends with the channel 27 extending through the portion of the protuberance extending from the end face of the block, as shown in Figure 6. The block 22 is provided with contact members comprising rods or posts screw threaded at the opposite ends and engaged in the openings 25 and secured therein by nuts releasably engaged on the screw threaded ends of the rods, as shown at 29. The ends of the openings 25 communicating with the recesses 24 are enlarged to countersink the nuts engaged on the rods below the face of the block 22 and adapt said nuts to engage the projecting contacts 17 of the heating element, as shown in Figure 4. The rods 29 are adapted to be connected to a source of electric energy by electric conductors 30 having the terminals thereof connected to the ends of the posts extending into the enlarged end portions of the openings 25 and secured thereto by the nuts engaged on said post ends, and said conductors being engaged in the arcuate recesses 24, extended through the opening 26 and engaged in the channel 27 with the conductors extending laterally from the block 22. The block 22 is positioned in the end of the shell arranged with the elongated opening 19 with the protuberance 28 engaged in said opening to guide the posts and nuts 29 into contact with the headed pins 17 connected to the terminals of the heating wire 10. The engagement of the projection 20 of the tubular member 11 and the protuberance 28 of the contact block 22 in the opening 19 of the shell 18 will prevent rotation of the heating element and contact block in the shell.

The contact block is enclosed in the shell by a cup shaped closure cap 39 slidable on the end of the shell arranged with the elongated opening 19 having a cut away portion 40 in the skirt or depending portion thereof slightly wider than the widths of the protuberance 28 and the opening 19 to accommodate the protuberance 28 and permit the crown of the cap to engage the end edge of the shell, as shown in Figure 2. The crown of the cap is arranged with a series of perforations around the periphery thereof, as at 41, to permit the radiation of heat from the shell and maintain said shell cool, and a central opening 42 in alinement with and slightly larger than the central opening 23 in the contact block 22 for a purpose to be hereinafter described.

The heating element is adapted to provide for the novel mounting and securing of a soldering bit 31 of suitable material, such as copper, in the shell centrally of and in heat contact with the heating element, by arranging the tubular member 11 with a bore of two different diameters at the opposite end portions of the member, the larger bore portion 32 extending the greater part of the length of the member and of a diameter greater than the diameter of the soldering bit and the other smaller bore portion 33 being of the same diameter as the opening 23 in the contact block 22. Means is mounted in the larger bore portion 32 to releasably retain the bit 31 in the shell and heating element and shown in Figures 2, 3 and 5 as comprising a tubular member 34 of resilient metallic material having an outer diameter less than the bore portion 32 and a bore to readily receive the bit and one end closed and arranged with a screw threaded opening, as at 35. The opposite end of the member is provided with an enlarged annular head of a diameter substantially the same as the outer diameter of the shell and having the inner end tapering toward the closed end of the tubular member, as at 36, and the outer end tapering toward the adjacent end at a less angle and of greater length than the tapering end portion or face 36, as shown at 37. Diametrically opposite portions of the head and body of the tubular member are adapted to be adjusted toward each other by slotting diametrically opposite portions of the member longitudinally thereof with the slots extending from the closed end 35 to and through the head portions 36, 37, as shown at 38, to provide the member with separate movable portions normally in spaced relation under the inherent tension of the material of said member and arrange said member as a releasable clamp. In the normal spaced or open position of the movable portions of the member 34, the body of the soldering bit is readily engaged within said member and the bit is releasably secured in the member by moving the movable portions toward each other and into impingement with the bit. This is accomplished by adjustably mounting the clamping member 34 in the large bore portion 32 of the heating element by means rotatably supported in the central opening 42 of the cap 39 and comprising a stem or rod 43 having a manipulating knob 44 at one end arranged with an inner circular bearing portion for engagement in the opening 42 and an annular shoulder to abut the top of the cap 39, as shown at 45 in Figures 2 and 4, and rotatably support the stem in the cap with the stem extending through the opening 23 of the contact block 22 and the small bore portion 33 of the heating element. The free end of the stem 43 extends into the large bore portion 32 of the heating element and is screw threaded for adjustable connection with the screw threaded opening of the closed end 35 of the clamping member 34, as shown at 46. The stem 43 is actuated by the knob 44 to draw the closed end 35 upon the screw threaded end 46 and the tapered head portion 36 into engagement with the edge of the end of shell 18 opposite the closed end thereof, whereby the movable half portions of the clamping member 34 are impinged about the soldering bit 31, as shown in Figures 2 and 3. The end edge of the bore of the shell is bevelled to facilitate engagement of the head portion 36 therewith, as shown in Figure 2. The end of the heating element arranged with the large bore portion 32 is spaced from the bevelled edge end of the shell a sufficient distance so as not to interfere with the engagement of the head portion 36 with said bevelled edge, and the length of the large bore portion is sufficient to permit free movement of the clamping member 34 therein and not to interfere with the engagement between the head portion 36 and the bevelled edge of the shell.

In the structure shown in Figures 2, 3 and 5, the clamping member 34 is formed from a tube and the closed end 35 may be a disk inserted and secured in one end of the tube. The clamping member may also be formed from sheet material as shown in the structure disclosed in Figures 8 and 9, wherein a rectangular sheet of relatively resilient metal is folded at two intermediate transverse sections equidistantly spaced from the opposite ends to form a transverse center portion 47 and two depending parallel portions 48 equal in length to the length of the member 34. The portions 48 are formed to arcuate shape in cross section with the side edges of the portions spaced from each other, as at 49, to permit movement of said portions toward each other. The bore formed by the curved or arcuate portions 48 is the same as the bore of the member 34. The member formed by the portions 47 and 48 is adjustably mounted in the large bore portion 32 of the heating element by the stem 43 and to permit the engagement of the screw threaded end 46 thereof with the transverse portion 47, said portion 47 is reinforced by a screw threaded member 50, such as a nut engaged and secured in the closed end of the member 47, 48, as shown in Figure 8. The curved longitudinal portions 48 are actuated toward each other into impingement with the soldering bit 31 by flaring out the free ends of the portions 48, as shown at 51, to engage an inwardly tapering opening arranged in the open end of the shell 18. The open end of the shell is restricted when the soldering bit securing member is formed in the manner set forth in connection with Figures 8 and 9, by providing an annular member 52 having a tapering bore 53 and an outer diameter substantially the same as the outer diameter of the shell. The peripheral surface of the annular member 52 is arranged with two faces tapering toward the opposite ends from an intermediate portion similar to the portions or faces 36, 37 of the head of the member 34 with the shorter face being forcibly inserted in the free end of the shell 18 until the intermediate portion of the member 52 is in engagement with the end edge of the shell and flush with the outer surface thereof, as shown at 54, and said member 52 is secured in said position in any suitable manner, such as soldering or welding. The smallest diameter of the bore 53 is slightly greater than the outer diameter of straight sections of the portions 48 with the bit 31 engaged in the bore formed by said portions to permit actuation of the member 47, 48 into the heating element bore portion 32 by the stem 43 to engage the flaring ends 51 with the tapering bore 53, the taper of said bore progressively actuating the portions 48 into impingement with the soldering bit to clamp the bit in predetermined position in the heating element and shell.

The face 37 of the clamping member 34 and the corresponding tapering face of the annular member 52 imparts length to the bit contacting face of the clamping member 34 or 48 without impairing the outer contour of the shell.

The drawing of the clamping member 34 or 48 in soldering bit clamping position will also draw the cap 39 into forceful engagement with the end of the shell arranged with the elongated opening 19 and retain the heating element and contact block 22 in the shell. To maintain the posts and nuts 29 in contact with the heads of the pins 17, a resilient member 55 is mounted in the space between the cap 39 and contact member 22 and is shown to be a metallic split washer insulated from the block 22 and the posts and nuts 29 of said block by an annular member 56 of insulating material engaged on the stem 43 between the resilient member 55 and contact block 22. The resilient member 55 will also apply a yielding force on the heating element and position the heating element in proper position relative the shell 18 and clamping member 34 or 48 regardless of irregularities of the heating element.

The clamping member 34 or 48 will also readily transmit the heat of the heating element to the soldering bit 31, as the tubular member 11 being of high thermal conductivity will transmit the heat of the wires 10 to the clamping member which is in proximity with the member 11 and the clamping member will transmit the heat thereof to the bit.

The central opening 23 of the contact block 22 and reduced bore portion 33 are larger than the diameter of the stem 43 and the space surrounding said stem will permit radiation of the heat of the soldering bit, clamping member and heating element through the perforations 41 in the closure cap 39.

To manipulate the shell 18, heating element 10, 11 and soldering bit 31 releasably clamped therein, there is provided a support for said members, shown in the form of a handle or hand grip 57 of suitable material, such as wood, or a molded material, such as vulcanite, condensite or "Bakelite" and the like, and of tubular tapering form having a circular guard 58 extending laterally from the hand grip adjacent the tapered end and a bore portion 59 of uniform diameter extending through and from the tapered end to a perforated partition wall extending transversely of the bore and adjacent the large or diverging end of the hand grip, as shown at 60 in Figure 2. The bore of the handle extending from the wall 60 to the diverging end of the hand grip is enlarged and corresponds to the outer contour of the handle to form an inwardly tapered recess 61 in the diverging end of the hand grip adapted for the mounting of a pair of blade contact members 62 of usual construction having their base or mounting portions fixed to the wall 60 on the opposite portions of the perforation in said wall by the usual binding screws 63 and insulated from the wall by insulating material 64.

The soldering iron shell 18 is releasably connected to the hand grip 57 to extend in angular relation to the axis thereof and have adjustments to different angular positions relative to the hand grip and along the longitudinal axis of the hand grip. This is accomplished by a pivoted bracket comprising a rectangular plate member 65 and a tubular member 66. The plate member 65 is of arcuate shape in cross section conforming to the curvature of the shell 18 and arranged with an elongated opening 67 centrally of the plate and having one end portion of enlarged arcuate shape to permit engagement with the marginal portions of the body of the opening of a headed pin fixed in and projecting from the shell intermediate the ends thereof and centrally of the opening 19 of the shell with the head of the pin spaced from the exterior of the shell a distance slightly greater than the thickness of the plate 65 to permit easy engagement of the plate with the pin and retain the plate tightly against the shell, as shown at 68 in Figures 2 and 3. The plate member is also arranged with a bifurcated portion at one end consisting of two arms 69 integral with the side edges of the plate and extended therefrom in an oblique direction having the free ends of rounded formation and centrally perforated. The tubular member 66 has an outer diameter slightly less than the bore portion 59 of the hand grip 57 to slidably mount the tubular member in said hand grip and an elongated opening 70 having an enlarged end portion in the wall intermediate the ends thereof for the engagement of the shank of a screw or bolt mounted in the hand grip intermediate the tapered end and guard 58 and adapted for the engagement of a nut on the end of the screw projecting into the tubular member, as shown at 71 in Figure 2. The screw is arranged with a slotted head to facilitate the tightening of the nut thereon and releasably retaining the tubular member 66 in predetermined position in the hand grip. An end of the tubular member 66 projecting from the tapered end of the hand grip is bifurcated with the bifurcations in the form of flat ear portions 72 perforated for the engagement of the smooth shanks of shoulder screws 73. Before the engagement of the screws 73 with the perforations of the ear portions 72, said ear portions are positioned in juxtaposed relation to the rounded ends of the arms 69 of the bracket plate 65 with the perforations of said ear portions and arms in registry for the engagement of the smooth shanks of the screws 73, and the ear portions and arms being retained on said shanks by a flat nut, as shown at 74 in Figure 3. The soldering iron shell 18 may readily be adjusted to different angular positions relative to the tubular member 66 and hand grip 57 without loosening or tightening the screws 73, when said screws are drawn up on the ear portions 72 and arms 69 under proper tension. The soldering iron shell 18 is extended longitudinally from the hand grip 57 by loosening the screw 71 to adjust the distribution of the weight thereof to suit the user and facilitate soldering points that could only be reached with difficulty otherwise.

The electric conductors 30 are of sufficient length to be extended from the channel 27 of the contact block 22 into the tubular bracket member 66 between the bifurcations 72 with the terminals of the conductors extended through the wall 60 and connected to the contact blades 62 by the screws 63. The length of the conductors is greater than the distance between binding posts and nuts 29 of the block 22 and the contact blades 62 in the fully extended position of the tubular member 66 relative to the hand grip, and when the tubular member is positioned into the hand grip, the conductors will curl or wind upon themselves within the bore portion 59 of the hand grip, as shown at 75 in Figure 2.

By this construction and arrangement of parts, the soldering shell 18 may be detached from the hand grip and be applied to another type of support by disconnecting the terminals of the conductors 30 from the contact blades 62 and removing the bracket plate 65 from the pin 68 of the shell.

Having thus described my invention, I claim:

1. In an electric soldering device, a tubular shell closed at one end, a member of electric insulating material having a central recess opening to one end thereof and mounted in the shell with the recess opening to the open end of the shell, an electric resistance element coiled about said insulating member, insulator means mounted in the closed end of the shell and carrying electric contact members adapted for electric connection with the terminals of the resistance element and conductors for connecting the resistance element to a source of electric energy, a tubular member of resilient material closed at one end with the open end enlarged and slotted longitudinally thereof to permit contracting of the bore thereof and mounted in the recess of the insulating member with the enlarged open end extending from the insulating member and adapted to abut the open end of the shell, a soldering bit mounted in the tubular member with the soldering end projecting from the shell, and means carried by the closed end of the shell and adjustably connected to the tubular member to draw the enlarged open end of the tubular member into abutment with the open end of the shell and contract the bore of the tubular member about the bit and clamp the bit therein.

2. An electric soldering device as claimed in claim 1, wherein the actuating means for the bit clamping tubular member comprises a stem rotatably supported at one end by the closed end of the shell and passing through the insulator means and closed end of the insulating member with the opposite end of the stem screw threaded to the closed end of the tubular member.

3. In a soldering device, a tubular shell closed at one end, a tubular heating element mounted in the shell, a clamping member extended through the open end of the shell into the bore of the heating element with a portion of the clamping member extending from the heating element and arranged to engage the open end of the shell, a soldering bit mounted in the clamping member with the soldering end projecting from the shell, and means extended through and abutting the closed end of the shell and adjustably connected to the clamping member and adapted to be actuated to position the clamping member into forceful engagement with the shell and said engagement causing the clamping member to grip and retain the bit in the shell.

4. In a soldering device, a tubular shell, a cap slidably mounted on one end of shell to close said end, a tubular heating element mounted in the shell, a clamping member extending through the open end of the shell into the bore of the heating element with a portion extending from the heating element and arranged to abut the open end of the shell, a soldering bit mounted in the clamping member with the soldering end projecting from the open end of the shell, and a stem having a knob at one end and screw threads on the opposite end rotatably mounted in the cap with the knob projecting from the exterior of the cap and the screw threads adjustably engaging the clamping member whereby the clamping member is adapted to be drawn into the heating element and into abutment with the end of the shell to cause the clamping member to grip and retain the bit in the clamping member and shell.

5. An electric soldering device as claimed in claim 4, wherein the bore of the heating element at the end thereof adjacent the cap is of reduced diameter to guide the stem into engagement with the clamping member.

6. In an electric soldering device, a tubular shell closed at one end, a tubular electric heating element mounted in the shell with the ends of the heating element terminating within the shell, an insulator member mounted in the shell between the closed end of the shell and the heating element and arranged with electric contacts adapted for electric connection with the heating element and conductors for connecting the heating element to a source of electric energy, a clamping member slidable in the heating element with a portion extending from the heating element and arranged to abut the open end of the shell, a soldering bit mounted in the clamping member with the soldering end projecting from the shell, and means rotatably supported by the closed end of the shell and adjustably connected to the clamping member whereby rotation of said means will actuate the clamping member into the heating element and into forceful engagement with the shell to cause the clamping member to grip and retain the bit in the shell.

7. In an electric soldering device as claimed in claim 6, resilient means engaged between the closed end of the shell and insulator member to maintain electric connection between the heating element and the electric contacts of the insulator member.

8. An electric soldering device as claimed in claim 6, wherein the shell is arranged with an opening in the wall adjacent the closed end thereof, and the heating element and insulator member are arranged with lateral projections to extend into said shell opening whereby said element and member are held against rotation and the heating element is supported by the shell with the insulator member being supported by the heating element.

9. In an electric soldering device, a tubular shell having one end closed, a tubular electric heating element mounted in the tubular shell, a clamping member comprising a tubular member closed at one end with the opposite end arranged with an enlarged annular head having a face tapering inwardly toward the body of the tubular member and having opposite longitudinal portions of the body slotted from the closed end to and through the head to permit contracting of the bore thereof, said tubular member being extended through the open end of the shell into the heating element with the tapered face of the head adapted to abut the open end of the shell, a soldering bit engaged in the clamping member with the soldering end projecting from the open end of the shell, and means rotatably supported in the closed end of the shell and adjustably connected to the closed end of the tubular clamping member, actuation of said means drawing the clamping member into the heating element and the tapered face of the head of said clamping member into forceful abutment with the open end of the shell whereby the bore of the clamping member is contracted and the bit is clamped in the shell.

10. In an electric soldering device, a tubular shell closed at one end and the opposite end arranged with a restricted opening tapering inwardly, a tubular electric heating element mounted in the shell between the closed end and restricted opening of the shell, a clamping member comprising a tubular member closed at one end and the opposite end open with an outwardly flaring mouth and having opposite longitudinal portions of the member slotted from the closed end to and through the flaring mouth, said clamping member being extended through the open end of the shell into the heating element with the flaring mouth of the open end of said member adapted to abut the tapering opening of the shell, a soldering bit engaged in the clamping member with the soldering end projecting from the open end of the shell, and means rotatably supported in the closed end of the shell and adjustably connected to the closed end of the tubular clamping member, actuation of said means drawing the clamping member into the heating element and the flaring mouth of the open end of said member into forceful abutment with the tapering opening of the shell whereby the bore of the clamping member is contracted and the bit is retained in the shell.

11. An electric soldering device as claimed in claim 10, wherein the tubular shell is in the form of a straight wall tube, and the restricted opening of the shell is formed by an annular member having an outer diameter slightly greater than the inner diameter of the tube, an outer tapering face at one end thereof to permit the forceful engagement of the annular member in the open end of the tube and a bore tapering inwardly toward the tube for the engagement of the flaring mouth of the clamping member.

12. In an electric soldering device, a tubular shell, a heating element including a tubular body of dielectric material having high thermal conductivity and carrying an electric resistance coil thereon, a clamping member extending through one end of the shell into the body of the heating element, and means extended through the opposite end of the shell into the body of the heating element operating in co-operation with said clamping member and the shell to draw the clamping member into the shell, and said clamping member and shell arranged to cause the clamping member to releasably clamp a soldering bit therein as the clamping member is drawn into the shell.

13. A soldering device including a tubular shell enclosing and carrying a tubular electric heating element and a soldering bit in the heating element extended through one end of the shell, a hand grip, and a pair of pivotally connected members, one of said members being adjustably connected to the hand grip and the other member being releasably connected to the shell, the first member adapted to be adjusted relative to the hand grip to vary the distance between the hand grip and shell, and the second member adapted to have adjustment on its pivotal connection with the first member on an axis extending transversely of the axis of the hand grip to position the soldering bit into different angular positions relative to the hand grip.

14. An electric soldering device including a tubular shell enclosing and carrying a tubular electric heating element, electric conductors connected to the heating element and extended through the wall of the shell, a clamping member adjustably mounted in the heating element and a soldering bit in the clamping member extended through one end of the shell and adapted to be retained in the shell by the adjustment of the clamping member, a tubular hand grip having electric contacts at one end thereof adapted to be connected to the conductors of the heating element passed through the opposite end of the hand grip, and a pair of pivotally connected members, one of said members being slidably mounted in the bore of the hand grip and the other member releasably connected to the shell of the heating element, the slidable mounting of the first member providing adjustment of the shell toward and away from the hand grip and the pivotal connection between the members permitting the positioning of the soldering bit into different angular positions relative to the hand grip.

15. An electric soldering device as claimed in claim 14, wherein the bore of the hand grip is arranged with a perforated partition adjacent one end thereof adapted to support the electric contacts, and the electric conductors are extended through the perforation in the partition for connection with the contacts and of a length to permit adjustment of the shell from the hand grip and adapted to coil within the bore of the hand grip and against the partition opposite the mounting of the contacts thereon when the shell is adjusted toward the hand grip.

16. An electric soldering device including a tubular shell enclosing and carrying a tubular electric heating element, a clamping member adjustably mounted in the bore of the heating element and a soldering bit in the clamping member extended through one end of the shell and adapted to be retained in the shell by adjustment of the clamping member, a tubular hand grip, a tubular member adjustably mounted in the bore of the hand grip with a portion extending from the hand grip, and a member pivotally connected to the portion of the tubular member extending from the hand grip and having a plate portion of arcuate form in cross section corresponding to the curvature of the shell and adapted to be releasably connected to the shell.

17. An electric soldering device as claimed in claim 16, wherein the hand grip is arranged with a perforation in the wall thereof and the tubular member is arranged with a slot in the wall thereof adapted to be registered with the perforation in the hand grip, and means adapted to be engaged in the perforation and slot to guide the tubular member in the hand grip and arranged to clamp the tubular member in the hand grip in predetermined position.

18. An electric soldering device as claimed in claim 16, wherein the shell is arranged with a headed projection fixed in and extending from the exterior of the shell, and the plate portion of the pivotally connected member is arranged with an elongated opening having an enlarged portion at one end to permit the engagement of the headed projection in the opening and whereby said member is releasably connected to the shell.

19. An electric soldering device as claimed in claim 16, wherein the extending portion of the tubular member is bifurcated, and the pivotally connected member is arranged with a bifurcated portion extending from the convex face of the plate portion, and said bifurcated portions adapted to be pivotally connected to each other.

LEMBERT H. MOULTHROP.